(12) United States Patent
Wang

(10) Patent No.: US 8,576,525 B2
(45) Date of Patent: Nov. 5, 2013

(54) SERIAL SURGE SUPPRESSION AND OVERLOAD PROTECTION OPTIMIZATION DEVICE

(75) Inventor: Chih-Hua Wang, Taipei (TW)

(73) Assignee: Anmax Lightning Technology Corp, Taipei (TW)

( * ) Notice: Subject to any disclaimer, the term of this patent is extended or adjusted under 35 U.S.C. 154(b) by 48 days.

(21) Appl. No.: 13/299,563

(22) Filed: Nov. 18, 2011

(65) Prior Publication Data

US 2013/0128398 A1    May 23, 2013

(51) Int. Cl.
*H02H 3/20*    (2006.01)
*H02H 3/08*    (2006.01)
*H02H 9/02*    (2006.01)

(52) U.S. Cl.
USPC ........... 361/56; 361/91.1; 361/93.1; 361/93.7

(58) Field of Classification Search
USPC .................................. 361/56, 93.7, 91.1, 93.1
See application file for complete search history.

(56) References Cited

U.S. PATENT DOCUMENTS

| | | | | |
|---|---|---|---|---|
| 4,246,622 A | * | 1/1981 | Hosoda et al. | 361/95 |
| 5,625,521 A | * | 4/1997 | Luu | 361/111 |
| 6,636,403 B2 | * | 10/2003 | McLoughlin et al. | 361/103 |
| 6,816,352 B2 | * | 11/2004 | Hoopes | 361/104 |
| 7,075,306 B2 | * | 7/2006 | Emori et al. | 324/430 |
| 8,093,764 B2 | * | 1/2012 | Hammond | 307/140 |
| 8,284,536 B2 | * | 10/2012 | Minarczyk et al. | 361/118 |

FOREIGN PATENT DOCUMENTS

DE    10 2007 042380    * 9/2007

* cited by examiner

*Primary Examiner* — Rexford Barnie
*Assistant Examiner* — Zeev V Kitov

(57) ABSTRACT

A serial surge suppression and overload protection optimization device has an input terminal, an output terminal and multiple surge suppression units. The surge suppression units are serially connected between the input terminal and the output terminal. Each surge suppression unit has two parallel inductors and multiple surge absorbing elements. Each surge absorbing element is connected to an output end of one of the parallel inductors and has a fuse serially connected therewith. When surge energy is excessively large, the fuse melts to separate the surge absorbing element from a main power loop without causing a short circuit within the main power loop due to the meltdown of the fuse. The optimization device is used with an automatic overload protection unit to normally supply power to equipment connected to the output terminal thereof and ensure electrical safety protection with a bypass circuit design thereof.

9 Claims, 6 Drawing Sheets

SERIAL SURGE SUPPRESSION AND OVERLOAD PROTECTION OPTIMIZATION DEVICE

FIELD OF THE INVENTION

The present invention relates to a serial surge suppression and overload protection optimization device, and more particularly to a surge suppression and overload protection optimization device having a fuse serially connected to an input terminal of a surge absorption element embedded in the optimization device and burning out upon having excessively large surge energy passing therethrough so as to separate the surge absorbing element from a main power loop having the surge absorbing element for safer protection.

BACKGROUND OF THE INVENTION

Lightning surges, switching surges and electromagnetic pulses (EMP) are usually the source triggering abnormal interference or power failure in electrical equipment. The three types of interference sources usually intrude upon electrical equipment via a power supply circuit, a signal circuit (control circuit) or the ground of a circuit. If lacking a sufficient ability or appropriate means to process surge energy or discharge current, equipment is prone to fault or interference. To this end, many electronic devices, communication devices, control devices and power supply devices are equipped with surge suppression devices as a countermeasure. Among them serial surge suppression and overload protection optimization devices are characterized by absorbing transient overvoltages, overcurrents and high surge energies in practical applications and achieving the objective of effectively preventing equipment disruptions and failures.

New generations of serial surge suppression optimization devices further have a counter capable of detecting the number of surge or EMP attacks upon a device. Besides an internal load-sharing design incorporating multiple serial surge suppression optimization devices that are parallelly connected for the load-sharing purpose so as to increase load currents, the new generations of serial surge suppression devices further have many practical functions and designs, such as automatic overload protection, display, detection and recovery of automatic bypass detection and the like.

However, the detailed design of the foregoing conventional serial surge suppression and overload protection optimization devices needs to be further improved. The most critical disadvantages are as follows.

1. The foregoing serial surge suppression and overload protection optimization devices mainly employ metal oxide varistor (MOV) therein as a surge protection element to process surge energy. When attacked by a surge, the conventional MOV may be shorted by way of two terminals thereof melting together after absorbing the surge energy. The consequence is that a short circuit occurs between the line wire (L) and the neutral wire (N), the line wire (L) and the ground (G) or the neutral line (N) and the ground (G). As a result, the serial surge suppression and overload protection optimization devices break down and fail to normally supply power after a surge attack.

2. After the MOV melts and is shorted, the foregoing serial surge suppression and overload protection optimization devices totally loses the surge suppression capabilities and fails to further provide any secondary surge protection capabilities after a surge attack.

3. The internal design of the foregoing serial surge suppression and overload protection optimization devices fails to accurately detect, adjust and control the magnitude of the overload current.

SUMMARY OF THE INVENTION

An objective of the present invention is to provide a serial surge suppression and overload protection optimization device having a fuse serially connected to an input terminal of a surge absorption element embedded in the optimization device and burning out upon having excessively large surge energy passing therethrough so as to separate the surge absorbing element from a main power loop having the surge absorbing element for safer protection.

To achieve the foregoing objective, the serial surge suppression and overload protection optimization device has an input terminal, an output terminal and multiple surge suppression units.

The surge suppression units are serially connected between the input terminal and the output terminal. Each surge suppression unit has two parallel inductors and multiple surge absorbing elements. Each surge absorbing element is connected to an output end of one of the parallel inductors and has a fuse serially connected therewith.

When surge energy of an intruding surge exceeds a threshold, each fuse serially connected with a corresponding surge absorbing element burns out to separate the surge absorbing elements from a main power loop connected with the surge absorbing elements for electrical safety protection purposes.

When surge energy is excessively large, the fuse melts down to separate from a main power loop without causing a short circuit within the main power loop due to the meltdown of the fuse. The optimization device can be utilized in an automatic overload protection unit to normally supply power to equipment connected to the output terminal thereof and ensure electrical safety protection with a bypass circuit design thereof.

Additionally, the present invention makes certain modifications and innovations in terms of a surge phase correction and compensation loop and noise cancellation at the output terminal so as to enhance the stability of the entire circuit, acquiring better safety results and effectively improving the power supply quality.

The foregoing and other features and advantages of the present invention will be more clearly understood through the following descriptions with reference to the drawings, wherein:

DETAILED DESCRIPTION OF THE PREFERRED EMBODIMENT

It is to be noted that the following descriptions of preferred embodiments of this invention are presented herein for purpose of illustration and description only; they are not intended to be exhaustive or to limit the invention to the precise form disclosed.

The present invention will now be described more specifically with reference to the following embodiments.

Figure 1:
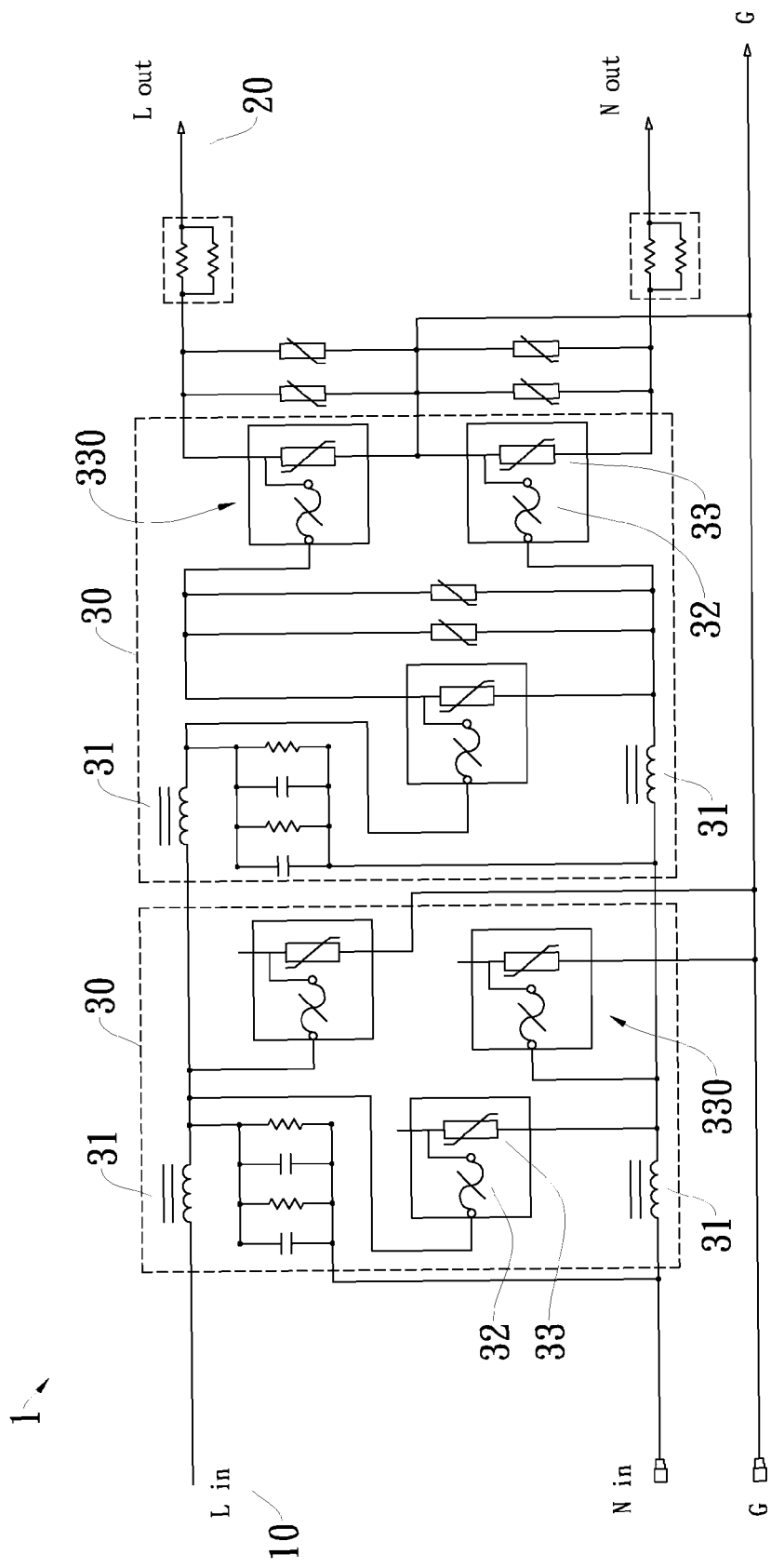
FIG. 1 is a circuit diagram of a first embodiment of a serial surge suppression optimization device in accordance with the present invention.
Figure 2:
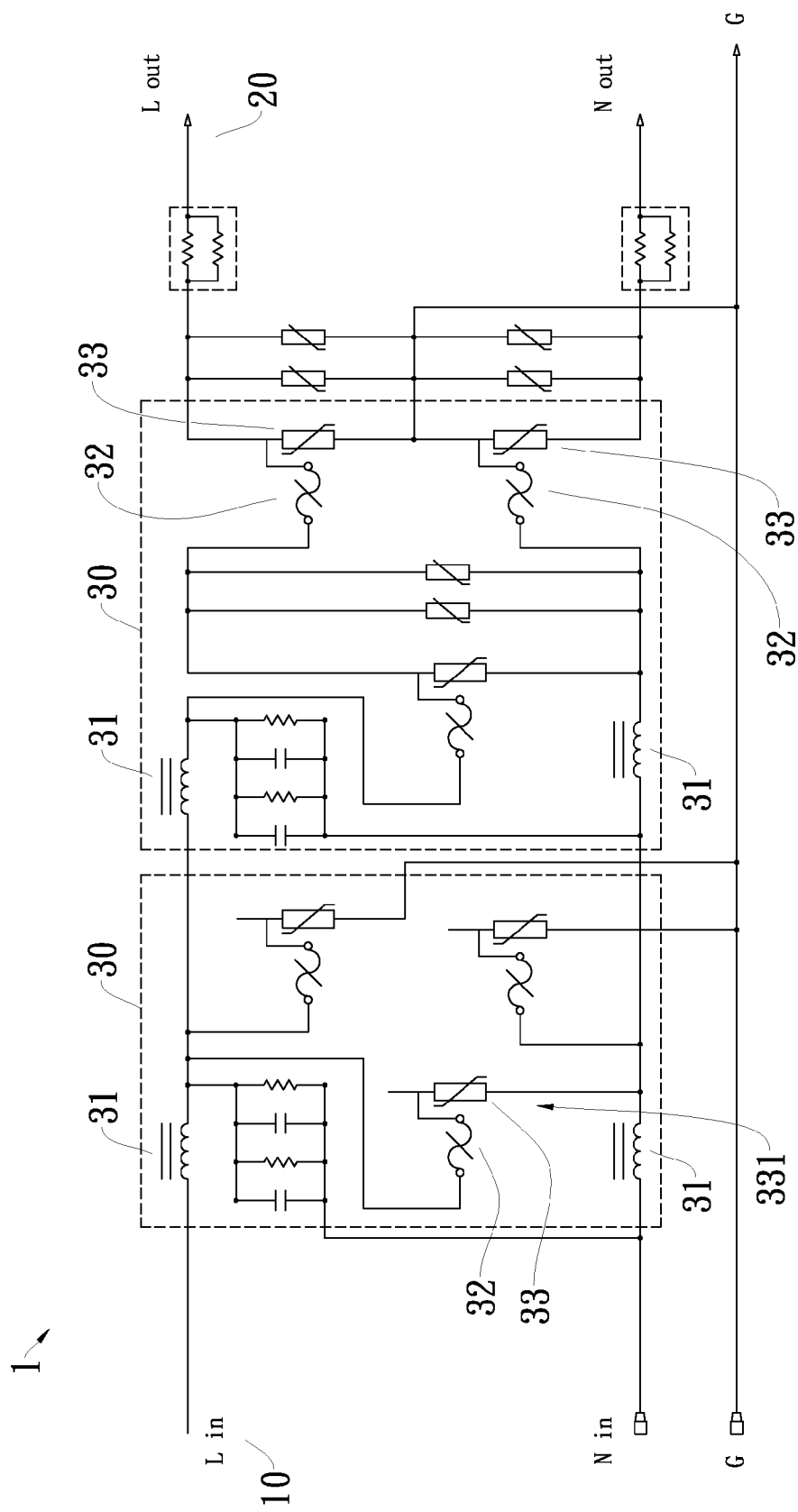
FIG. 2 is a circuit diagram of a second embodiment of a serial surge suppression optimization device in accordance with the present invention.

With reference to FIGS. 1 and 2, a serial surge suppression and overload protection optimization device 1 in accordance with the present invention has an input terminal 10, an output terminal 20 and multiple surge suppression units 30.

The surge suppression units 30 are serially connected between the input terminal 10 and the output terminal 20. Each surge suppression unit 30 has at least one set of parallel inductors 31 and three surge absorbing elements 33. Each surge absorbing element 33 is connected to an output end of one of the set of parallel inductors 31 and has a fuse 32 serially connected therewith.

The fuse 32 is a thermal fuse. The fuse and the surge absorbing element 33 may be a thermally protected metal oxide varistor (TMOV) integrated in single chip package and having a temperature fuse 32 therein as shown in FIG. 1, or a standalone MOV 331 having a separate temperature fuse 32 serially connected to an input end of the MOV 331 as shown in FIG. 2. The temperature fuse 32 is attached on a surface of the MOV 331 or mounted in proximity to the MOV 331 to simulate an equivalent circuit effect as the TMOV 330.

In the present embodiment, the serial surge suppression and overload protection optimization device 1 has two surge suppression units 30. When implemented, a pre-stage surge suppression unit 30 has three surge absorbing elements 33 and two parallel inductors 31, each surge absorbing element 33 has a fuse 32 serially connected therewith for overload protection and two of the surge absorbing elements are connected between the ground wire (G) and the output ends of the parallel inductors 31, and the three fuses 32 are not serially connected to each other through a line wire (L) and a neutral wire (N) of a main power loop. The post-stage surge suppression unit 30 has three surge absorbing elements 33 and two parallel inductors 31. Each surge absorbing element 33 has a fuse 32 serially connected therewith for overload protection. Each surge absorbing element 33 is connected between the output ends of the two parallel inductors 31 or between the line wire (L) and the neutral wire (N) of the main power loop. Each fuse 32 is serially connected with the line wire (L) or the neutral line (N) of the main power loop. For instance, two of the fuses 32 are serially connected with the line wire (L) of the main power loop and the remaining one of the fuses 32 is serially connected with the neutral wire (N) of the main power loop, or two of the fuses 32 are serially connected with the neutral wire (N) of the main power loop and the remaining one of the fuses 32 is serially connected with the line wire (L) of the main power loop.

Given the foregoing circuit design, the surge absorbing elements 33 generate heat when surge energy passes therethrough. If the heat is excessively large, the fuse 32 is melted into an open circuit so that both ends of the surge absorbing element 33 of a shorted MOV or TMOV are separated from the main power loop to ensure safer protection. Products manufactured by adopting the foregoing circuit design fully comply with electrical safety standards so as to achieve compliance for safety certification of Underwrites Laboratories Inc.

Figure 3:
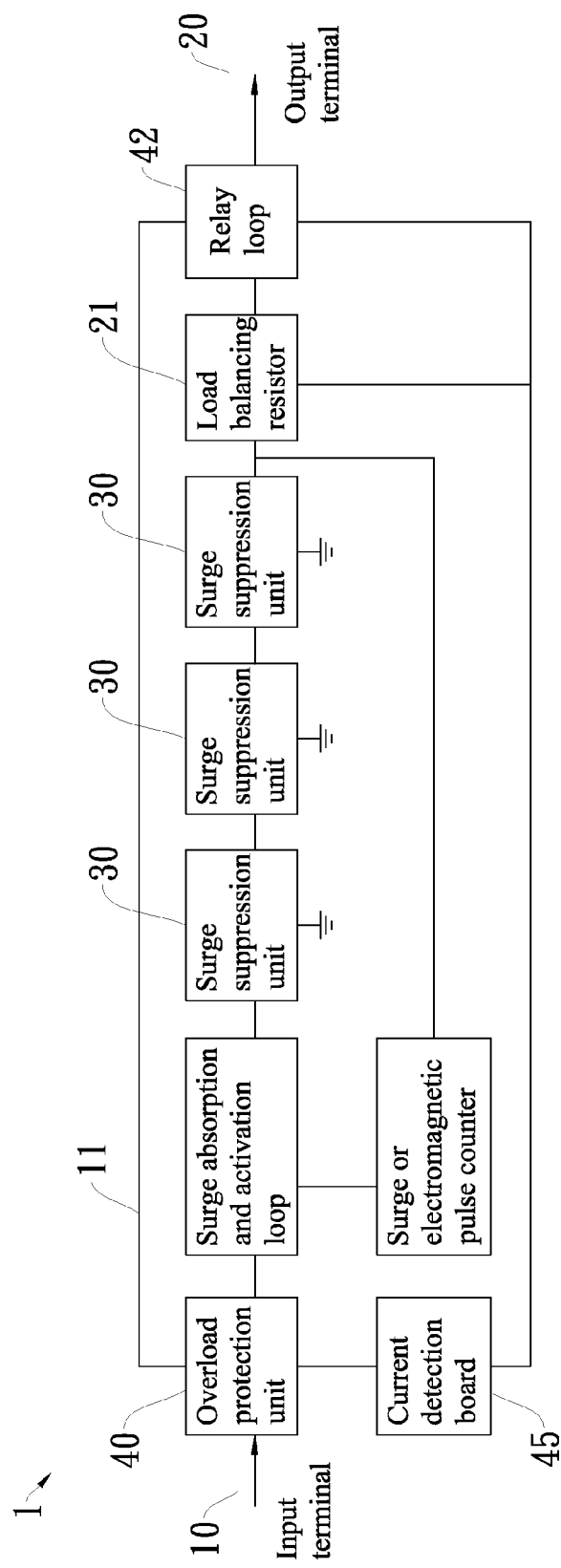
FIG. 3 is a functional block diagram of the serial surge suppression optimization device in FIG. 1 or 2 further having an overload protection unit.

With reference to FIGS. 1 to 3, the serial surge suppression and overload protection optimization device is characterized in that the serial surge suppression and overload protection optimization device 1 in combination with an automatic overload protection unit 40 can be applied to equipment for which long power outages are unacceptable. When surge energy is excessively large, the fuses 32 of the post-stage surge suppression unit 30 serially connected to the line wire (L) or neutral wire (N) of the main power loop burn out to break the main power loop so that a short circuit within the main power loop arising from the meltdown of the surge absorbing element 33 does not occur. Given the serial surge suppression and overload protection optimization device 1 and the automatic overload protection unit 40, power can be still be supplied to equipment connected to an output terminal of the serial surge suppression and overload protection optimization device 1, thereby not only ensuring safety protection and normal power supplies but also reducing the loss out of short power outage.

Moreover, when the automatic overload protection unit 40 is activated to supply power, the front-stage surge suppression unit 30 is parallelly connected to take effect in partially absorbing surge energy and serve as a secondary protection means for the electrical safety of the circuit as the fuses 32 of the front-stage surge suppression unit 30 are not serially connected to the line wire (L) and the neutral wire (N) of the main power loop and the surge absorbing elements 33 won't burn out (a surge absorption and activation loop and an electromagnetic pulse counter in FIG. 3 are not the subject of the present invention and are thus not described here).

Figure 4:
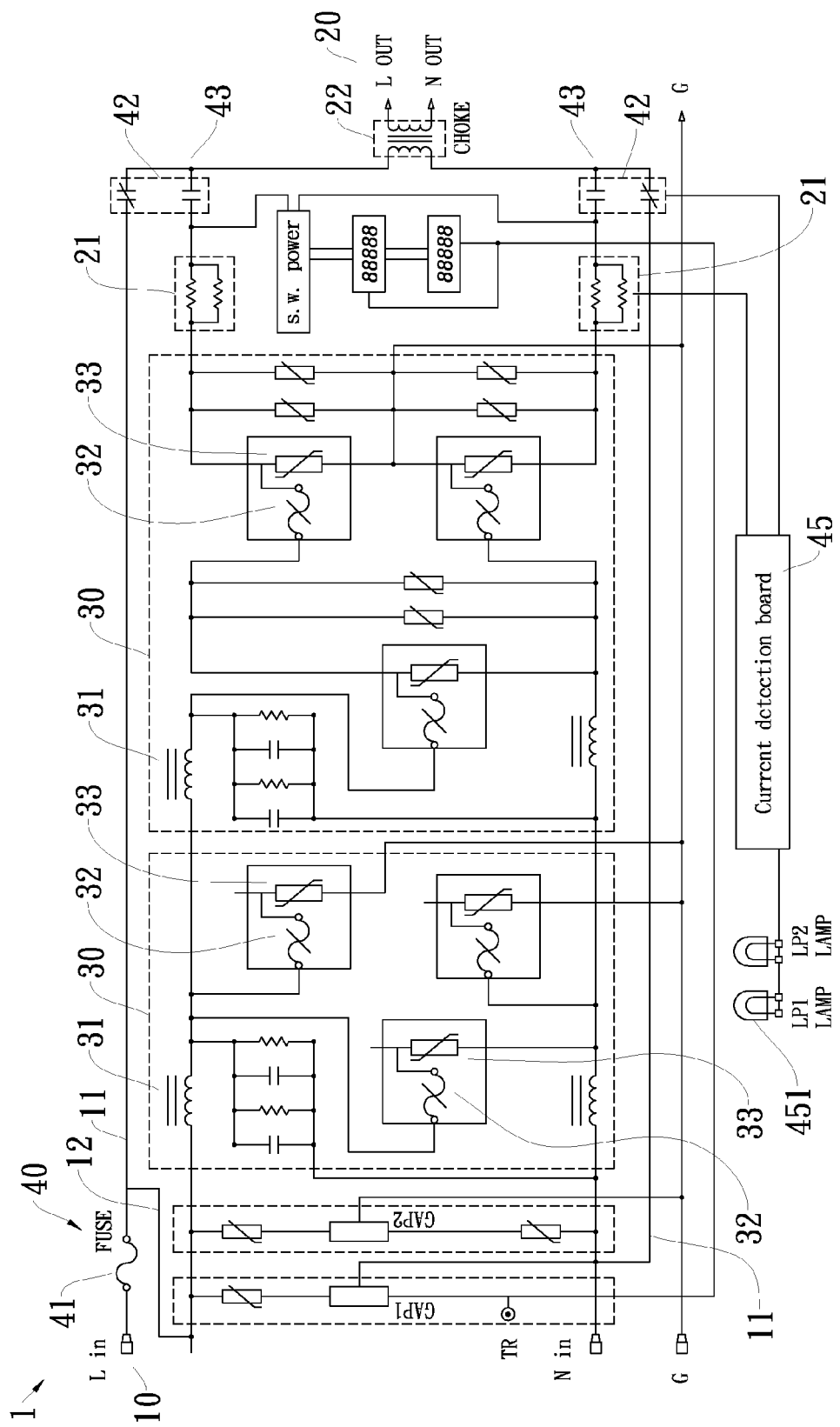
FIG. 4 is a circuit diagram of the serial surge suppression optimization device in FIG. 3.
Figure 5:
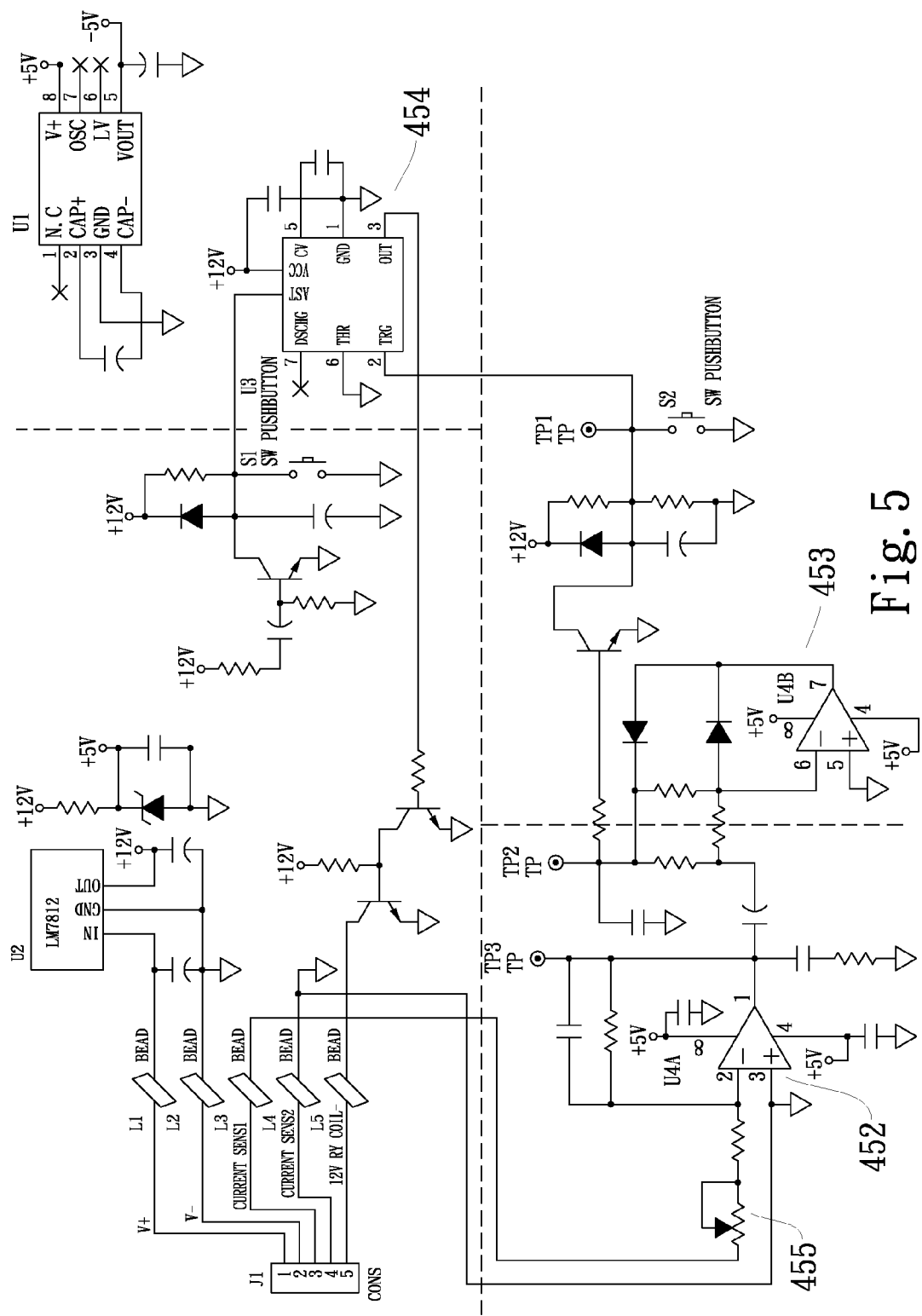
FIG. 5 is a circuit diagram of an overload detection board of the serial surge suppression optimization device in FIG. 4.

With reference to FIGS. 4 and 5, a circuit for an automatic overload protection unit 40 includes a by-pass circuit 11 and an overcurrent detection board 45. The by-pass circuit 11 is serially connected to a fuse 41. A loop of a line wire (L) has a branch circuit 12 parallelly connected with an input terminal 10 and connected to an output end of the fuse 41. A relay loop 42 has two switching contacts 43 connected between the by-pass circuit 11 and an output terminal 20. Two load balancing resistors 21 are respectively connected to the switching contacts 43 so that multiple surge suppression devices 1 can have nearly consistent internal impedances and electrical properties when parallelly connected in operation, and each surge suppression device 1 can evenly share a total current to equipment connected to the output terminal 20 to enhance safety protection capabilities at no risk of burnout arising from uneven current carrying capacity. A choke 22 is serially connected between the switching contacts 43 of the relay loop 42 to provide additional noise cancellation effects and make circuit applications more stable.

The overcurrent detection board 45 can have multiple status indicators 451 mounted thereon. One terminal of the overcurrent detection board 45 is connected to the relay loop 42, and another terminal thereof is connected to one of the load balancing resistors 21 to acquire a sample current. The overcurrent detection board 45 has an amplification comparator 452, a signal rectifier 453, a power amplification IC 454 and a potentiometer 455 therein to adjust a signal amplification rate, thereby configuring an overcurrent activation point, such as 15 A or 19 A AC current, and conveniently tailoring to a customized demand prior to delivery.

Such an overcurrent detection board 45 has the advantage of being compact. Since an overload tripping speed of the overcurrent detection board 45 is much faster than those of conventional mechanical overcurrent circuit breakers and the operating characteristic curve thereof is more stable than and superior to those of the conventional mechanical overcurrent circuit breakers, electronic devices equipped with the overcurrent detection board 45 can provide greater electrical safety.

As the input terminal 10 is connected to an additionally equipped automatic overload protection unit 40, if the surge suppression device 1 is in a normal state when applied, power thereof can smoothly pass through the surge suppression units 30 to post-stage equipment. When the post-stage equipment is overloaded or short-circuited and the short circuit current exceeds a design current value within a rated current range, for example 15 A, the automatic overload protection unit 40 cuts off the normal power supply circuit of the surge suppression units 30, and switches to connect to the by-pass circuit 11 so as to direct power to the post-stage equipment through the by-pass circuit 11, to keep supplying power to the post-stage equipment, and protect itself and the post-stage equipment. Meanwhile, one of the status indicators 451 is lit indicative of a tripping state. Before the overload condition is not eliminated, the automatic overload protection unit 40 stays on continuously to remind equipment users to get rid off the overload condition.

Figure 6:
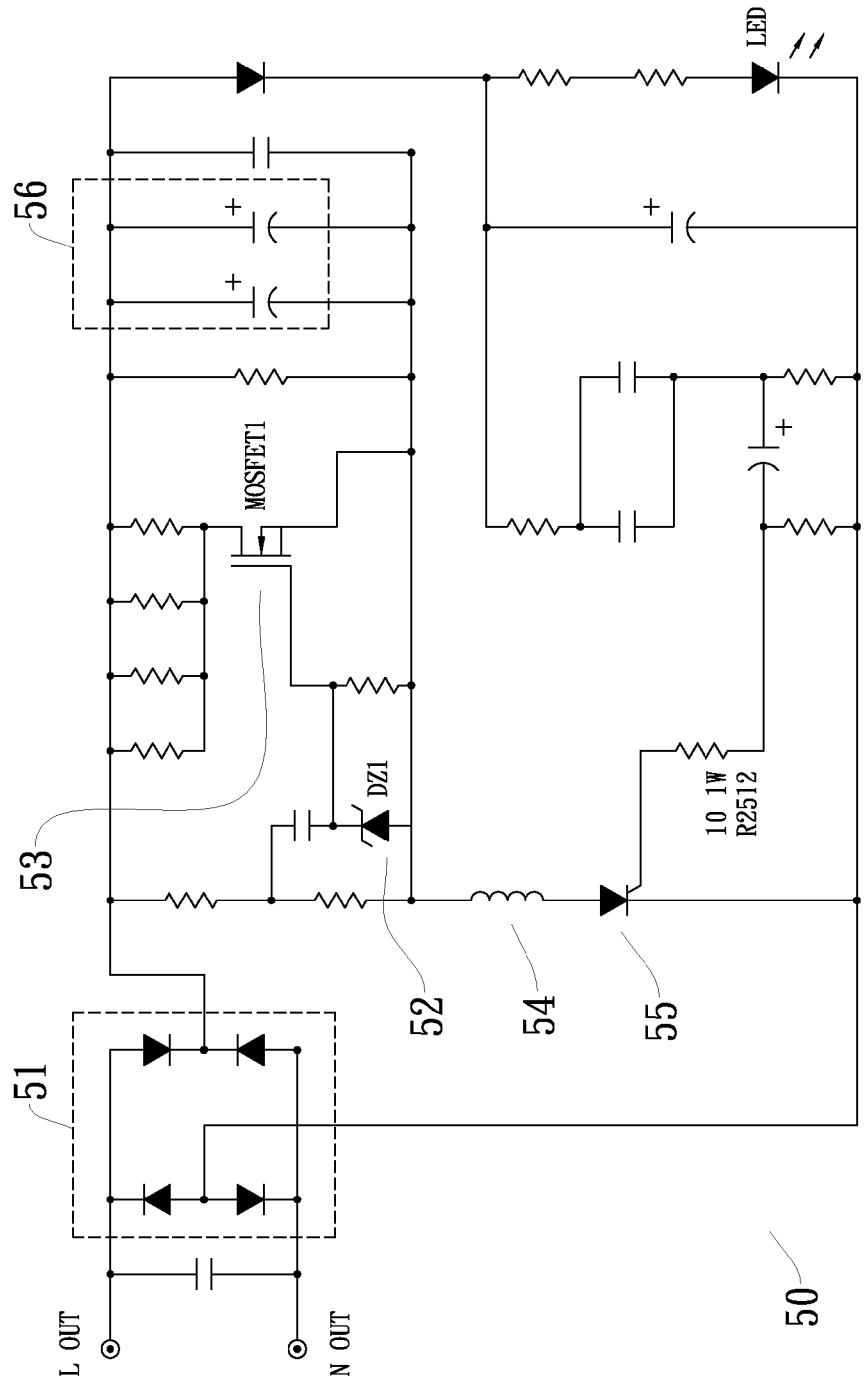
FIG. 6 is a circuit diagram of an embodiment surge phase correction compensation loop in accordance with the present invention.

Moreover, with reference to FIG. 6, when implemented, the serial surge suppression and overload protection optimization device 1 can further have a surge phase correction and compensation loop 50 connected to the output terminal 10 and between the loop of the line wire (L) and the loop of the neutral wire (N) of the surge suppression device 1 for enhanced optimization and protection. The surge phase correction and compensation loop 50 has a diode bridge 51, a zenor diode 52, a MOSFET 53, multiple capacitors 56, an inductor 54 and a silicon controlled rectifier (SCR) 55. The zenor diode 52, the MOSFET 53 and the capacitors 56 are parallelly and sequentially connected to an output terminal of the diode bridge 51, the inductor 54 serves to adjust the phase of the bypass pulse, the SCR 55 is serially connected to the cathode of the zenor diode 52 through the inductor 54 so that the diode bridge 51 is operated to supply power to the capacitors 56. As one end of each capacitor 56 is connected to the MOSFET 53, the MOSFET 53 is short-circuited when activated so that the capacitors 56 discharge all their stored power. The surge phase correction and compensation loop 50 can perform to truly convert intruding surge energy when operated so that the output power can have a corrected waveform approximating a standard sinusoidal wave.

The numbers of SCRs 55 and the capacitors 56 may be single or multiple (not shown) depending on the type of equipment to be protected and customized requirements in production to meet different practical needs.

In sum, the present invention provides the practical and innovative value to the industry and the application is hereby submitted in accordance with the patent laws.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A serial surge suppression and overload protection optimization device comprising:
    an input terminal;
    an output terminal; and
    multiple surge suppression units serially connected between the input terminal and the output terminal, each surge suppression unit having:
        two parallel inductors; and
        multiple surge absorbing elements, each surge absorbing element connected to an output end of one of the parallel inductors and having a fuse serially connected therewith;
    whereby when surge energy of an intruding surge exceeds a threshold, each fuse serially connected with a corresponding surge absorbing element burns out to separate the surge absorbing element from a main power loop connected with the surge absorbing element for electrical safety protection, wherein:
    the serial surge suppression and overload protection optimization device has two surge suppression units and a ground wire;
    a pre-stage surge suppression unit has three surge absorbing elements, wherein each surge absorbing element has a fuse serially connected therewith for overload protection and is connected between two of the ground wire (G) and the output ends of the parallel inductors, and the three fuses are not serially connected to the line wire (L) and the neutral wire (N) of the main power loop;
    a post-stage surge suppression unit has three surge absorbing elements, wherein each surge absorbing element has a fuse serially connected therewith for overload protection and is connected between two of the ground wire (G) and the output ends of the parallel inductors, each fuse is serially connected with the line wire (L) or the neutral line (N) of the main power loop;
    two of the fuses are serially connected with the line wire (L) of the main power loop and the remaining one of the fuses is serially connected with the neutral wire (N) of the main power loop, or two of the fuses are serially connected with the neutral wire (N) of the main power loop and the remaining one of the fuses is serially connected with the line wire (L) of the main power loop; and
    a surge phase correction and compensation loop is connected to the output terminal and between the loop of the line wire (L) and the loop of the neutral wire (N) of the surge suppression device, and has a diode bridge, a zenor diode, a MOSFET, multiple capacitors, an inductor and a silicon controlled rectifier (SCR), the zenor diode, the MOSFET and the capacitors are parallelly and sequentially connected to an output terminal of the diode bridge, the inductor serves to adjust a phase of a bypass pulse, the SCR is serially connected to the cathode of the zenor diode through the inductor so that the diode bridge is operated to supply power to the capacitors, and one end of each capacitor is connected to the MOSFET, the MOSFET short-circuited when activated so that the capacitors discharge all power stored therein.

2. The serial surge suppression and overload protection optimization device as claimed in claim 1, wherein the fuses are thermal fuses.

3. The serial surge suppression and overload protection optimization device as claimed in claim 1, wherein each fuse and a corresponding surge absorbing element are a thermally protected metal oxide varistor (TMOV) integrated in single chip package and having a temperature fuse therein.

4. The serial surge suppression and overload protection optimization device as claimed in claim 1, wherein each fuse and a corresponding surge absorbing element are a standalone metal oxide varistor (MOV) having a separate temperature fuse serially connected to an input terminal of the MOV.

5. A serial surge suppression and overload protection optimization device comprising:
an input terminal;
an output terminal; and
multiple surge suppression units serially connected between the input terminal and the output terminal, each surge suppression unit having:
two parallel inductors; and
multiple surge absorbing elements, each surge absorbing element connected to an output end of one of the parallel inductors and having a fuse serially connected therewith;
whereby when surge energy of an intruding surge exceeds a threshold, each fuse serially connected with a corresponding surge absorbing element burns out to separate the surge absorbing element from a main power loop connected with the surge absorbing element for electrical safety protection, wherein:
the serial surge suppression and overload protection optimization device has two surge suppression units and a ground wire;
a pre-stage surge suppression unit has three surge absorbing elements, wherein each surge absorbing element has a fuse serially connected therewith for overload protection and is connected between two of the ground wire (G) and the output ends of the parallel inductors, and the three fuses are not serially connected to the line wire (L) and the neutral wire (N) of the main power loop;
a post-stage surge suppression unit has three surge absorbing elements, wherein each surge absorbing element has a fuse serially connected therewith for overload protection and is connected between two of the ground wire (G) and the output ends of the parallel inductors, each fuse is serially connected with the line wire (L) or the neutral line (N) of the main power loop; and
two of the fuses are serially connected with the line wire (L) of the main power loop and the remaining one of the fuses is serially connected with the neutral wire (N) of the main power loop, or two of the fuses are serially connected with the neutral wire (N) of the main power loop and the remaining one of the fuses is serially connected with the line wire (L) of the main power loop;
and wherein the serial surge suppression and overload protection optimization device further comprises an automatic overload protection unit, the automatic overload protection unit comprising:
a by-pass circuit serially connected to a fuse, wherein a loop of line wire (L) has a branch circuit parallelly connected with the input terminal and connected to an output end of the fuse, a relay loop has two switching contacts connected between the by-pass circuit and the output terminal, and two load balancing resistors are respectively connected to the switching contacts; and
an overcurrent detection board having:
a first terminal connected to the relay loop;
a second terminal thereof connected to one of the load balancing resistors to acquire a sample current;
multiple status indicators mounted thereon;
an amplification comparator, a signal rectifier and a power amplification IC therein;
and
a potentiometer serving to adjust a signal amplification rate and configure an overcurrent activation point;
wherein a choke is serially connected between the switching contacts of the relay loop to additionally provide noise cancellation.

6. The serial surge suppression and overload protection optimization device as claimed in claim 5, further comprising a surge phase correction and compensation loop, wherein the surge phase correction and compensation loop is connected to the output terminal and between the loop of the line wire (L) and the loop of the neutral wire (N) of the surge suppression device, and has a diode bridge, a zenor diode, a MOSFET, multiple capacitors, an inductor and a silicon controlled rectifier (SCR), the zenor diode, the MOSFET and the capacitors are parallelly and sequentially connected to an output terminal of the diode bridge, the inductor serves to adjust a phase of a bypass pulse, the SCR is serially connected to the cathode of the zenor diode through the inductor so that the diode bridge is operated to supply power to the capacitors, and one end of each capacitor is connected to the MOSFET, the MOSFET short-circuited when activated so that the capacitors discharge all power stored therein.

7. The serial surge suppression and overload protection optimization device as claimed in claim 5, wherein the fuses are thermal fuses.

8. The serial surge suppression and overload protection optimization device as claimed in claim 5, wherein each fuse and a corresponding surge absorbing element are a thermally protected metal oxide varistor (TMOV) integrated in single chip package and having a temperature fuse therein.

9. The serial surge suppression and overload protection optimization device as claimed in claim 5, wherein each fuse and a corresponding surge absorbing element are a standalone metal oxide varistor (MOV) having a separate temperature fuse serially connected to an input terminal of the MOV.

* * * * *